United States Patent
Rasztovits-Wiech

(10) Patent No.: US 8,238,762 B2
(45) Date of Patent: Aug. 7, 2012

(54) METHOD AND ARRANGEMENTS FOR IMPROVING SIGNAL QUALITY

(75) Inventor: Michael Rasztovits-Wiech, Vienna (AT)

(73) Assignee: Nokia Siemens Networks GmbH & Co., Munich (DE)

( * ) Notice: Subject to any disclaimer, the term of this patent is extended or adjusted under 35 U.S.C. 154(b) by 752 days.

(21) Appl. No.: 12/375,512

(22) PCT Filed: Jul. 11, 2007

(86) PCT No.: PCT/EP2007/057113
§ 371 (c)(1),
(2), (4) Date: Feb. 19, 2009

(87) PCT Pub. No.: WO2008/012205
PCT Pub. Date: Jan. 31, 2008

(65) Prior Publication Data
US 2009/0317080 A1 Dec. 24, 2009

(30) Foreign Application Priority Data
Jul. 28, 2006 (DE) .......................... 10 2006 035 097

(51) Int. Cl.
*H04B 10/06* (2006.01)
(52) U.S. Cl. .......................... 398/213; 398/209; 398/210
(58) Field of Classification Search ........... 398/202–214
See application file for complete search history.

(56) References Cited

U.S. PATENT DOCUMENTS

| | | | | |
|---|---|---|---|---|
| 7,505,695 B2* | 3/2009 | Sugihara et al. | .............. | 398/202 |
| 2003/0206744 A1* | 11/2003 | Doh et al. | ..................... | 398/209 |
| 2005/0281565 A1 | 12/2005 | Duanmu | | |
| 2007/0140693 A1* | 6/2007 | Li et al. | ........................... | 398/67 |

OTHER PUBLICATIONS

Leeson, M.S.: "Calculation of sensitivity penalty for optically preamplified burst mode receivers using Fabry-Perot filters", Electronics Letters, IEE Stevenage, GB, Bd. 34, Nr. 11, May 28, 1998, ISSN: 0013-5194; XP006009779.

Jabar, S.A. et al.: "Minimization of amplified spontaneous emission noise in upstream SuperPON 512 ONU, 10 Gbit/s", 2005 International Conference on Wireless and Optical Communications Networks (IEEE Cat. No. 05EX1035), Dubai, United Arab Emirates, Mar. 6, 2005, XP002449309, IEEE Piscataway, NJ, USA, Seiten 145-149, ISBN: 0-7803-9019-9.

* cited by examiner

*Primary Examiner* — Nathan Curs
(74) *Attorney, Agent, or Firm* — Laurence A. Greenberg; Werner H. Stemer; Ralph E. Locher

(57) ABSTRACT

The invention relates to a bandpass filter (OFI) which is mounted downstream of an optical amplifier (OV) and allows noise to be largely reduced. In order for said bandpass filter to be able to optimally receive burst signals (BS1, BS2, . . . , BSN) transmitted by several user devices (ONT1, ONT2, . . . , ONTN) also in a central node (OLT), the bandpass filter is set to the respective received carrier frequencies (TF1 to TFN). Because of time constraints, this is possible only if the carrier frequencies (TF1, . . . ) or associated filter setting values (FE1, . . . ) have already been stored and the bandpass filter is preset.

36 Claims, 3 Drawing Sheets

METHOD AND ARRANGEMENTS FOR IMPROVING SIGNAL QUALITY

CLAIM FOR PRIORITY

This application is a national stage application of PCT/EP2007/057113, filed Jul. 11, 2007, which claims the benefit of priority to German Application No. 10 2006 035 097.9, filed Jul. 28, 2006, the contents of which hereby incorporated by reference.

TECHNICAL FIELD OF THE INVENTION

The invention relates to a method and to arrangement for improving the signal quality of received optical burst signals.

BACKGROUND OF THE INVENTION

In point-to-multipoint networks—such as the passive optical network (PON)—optical burst, signals (databursts) are transmitted in time-division multiplex method from user devices (ONTs) to a central node (OLT). In this context, the carrier frequencies can be slightly different from burst signal to burst signal especially when inexpensive lasers are used. Between the user devices and the receiving device of the central node or, respectively, in the receiving device of the central node, at least one optical amplifier is arranged which adds optical noise, the so-called "amplified spontaneous emission". To obtain from the demodulator a data signal which is as free of interference as possible, it is necessary to filter the received optical signal with as narrow a bandwidth as possible in order to reduce the optical noise as far as possible.

In patent application GB 2315 939 A, a fiber amplifier is described which is followed by a tracking filter for reducing the noise. The amplifier described is suitable for use in point-to-point connections. In point-to-multipoint connections, however, this would assume the presence of precisely identical carrier frequencies for all transmitting devices of the user devices. This again necessitates frequency-stabilized or frequency-controlled lasers which, however, cost considerably more than normal lasers.

SUMMARY OF THE INVENTION

The invention, in point-to-multipoint systems, discloses a cost-effective method for improving the signal quality and arrangements suitable for carrying out the method.

The method according to one embodiment of the invention uses a tunable bandpass filter and, in particular, has the advantages that neither a stabilization of the lasers of the user devices is required nor a service channel from the central node to the user devices (ONTs) is required for tuning the frequencies of their transmit lasers to the passband of the optical bandpass filter. The essential factor is a presetting of the bandpass filter in order to adapt it in time to the characteristics of the burst signals in the shortest time.

A further advantage is given by the fact that any user devices can be connected since these do not have to have any additional devices for frequency control.

To optimize also the demodulation and the subsequent decision for a binary value, the controller can control the optical amplifier or an electrical amplifier following the demodulator in order to equalize the different amplitudes of the burst signals before the decider stage.

By connecting two (or more) bandpass filters in parallel, the problem of an adjusting time which is too long can be avoided.

Whilst one bandpass filter is active, the other bandpass filter can be adjusted to the carrier frequency of the subsequent burst.

A further embodiment uses a filter bank with several parallel-connected optical bandpass filters, the center frequencies of which deviate from one another. For each received burst signal, the optimum filter is selected by a controller.

BRIEF DESCRIPTION OF THE DRAWINGS

The invention will now be described in greater detail with reference to exemplary embodiments, in which.

DETAILED DESCRIPTION OF THE INVENTION

Figure 1:
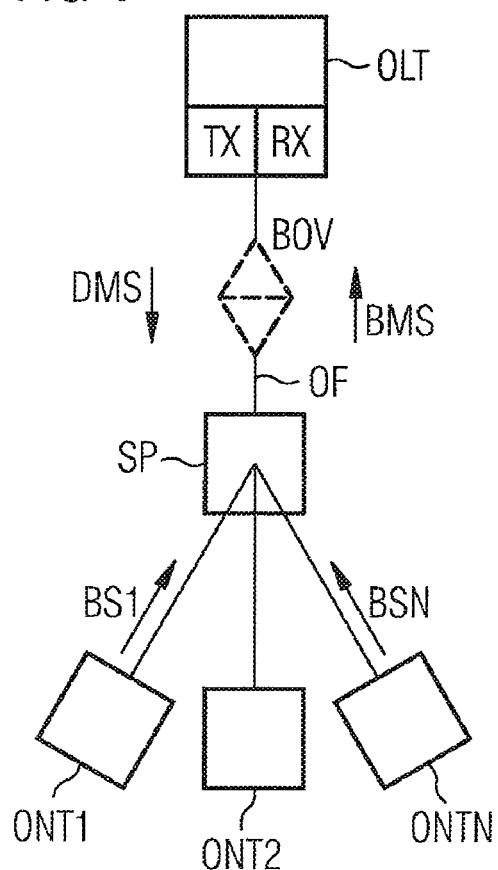
FIG. 1 shows a basic circuit diagram of a passive optical network.
Figure 2:
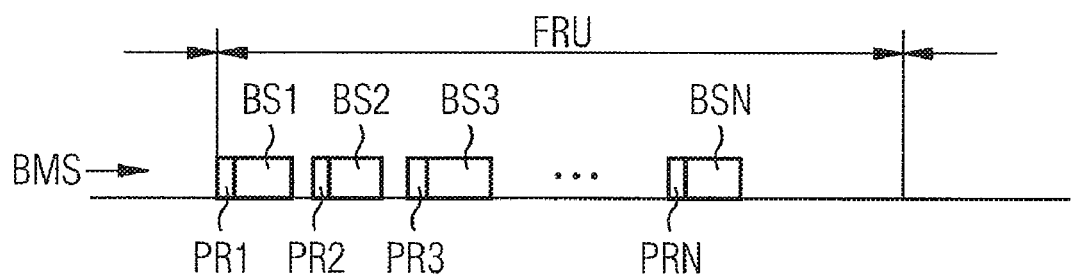
FIG. 2 shows an upstream frame for burst signals.

FIG. 1 shows the basic circuit diagram of a central node OLT with transmitting device TX and receiving device RX, which node is connected to several user devices ONT1-ONTN via an optical fiber OF and a splitter SP. The user devices send burst signals BS1-BSN in time-division multiplex mode, here called burst time-division multiplex signal BNS, within an upstream pulse frame FRU shown in FIG. 2. A longer pause can occur after the last burst signal.

In the user devices, the optical carrier frequencies of the burst signals are generated by. inexpensive lasers so that the carrier frequencies can deviate from one another considerably. In the receiving device RX of the central node OLT, the incoming burst signals are first amplified in an optical amplifier, not shown in FIG. 1. However, the optical amplifier or a further (bidirectional) amplifier BOV (drawn dashed in FIG. 1) can also be arranged between splitter and central node. However, each optical receiving amplifier adds further optical noise, called ASE (amplified spontaneous emission), which further degrades the existing signal/noise ratio. This effect is therefore reduced by an optical bandpass filter connected downstream of the amplifier. The bandwidth of this filter is selected to be as narrow as possible which is why the center frequency or the passband must be tuned to the carrier frequencies of the different burst signals. Due to the accurate tuning of the center frequency, one-sided distortions of the optical burst signals, and thus of the demodulated binary signals, are avoided, at the same time. Although each burst signal contains a short preamble PR at the beginning of the burst, a sufficiently accurate frequency measurement and tuning of the bandpass filter is not possible during the short period of the preamble. According to the invention, this problem is solved by a controlled presetting (pretuning) of the bandpass filter.

Figure 3:
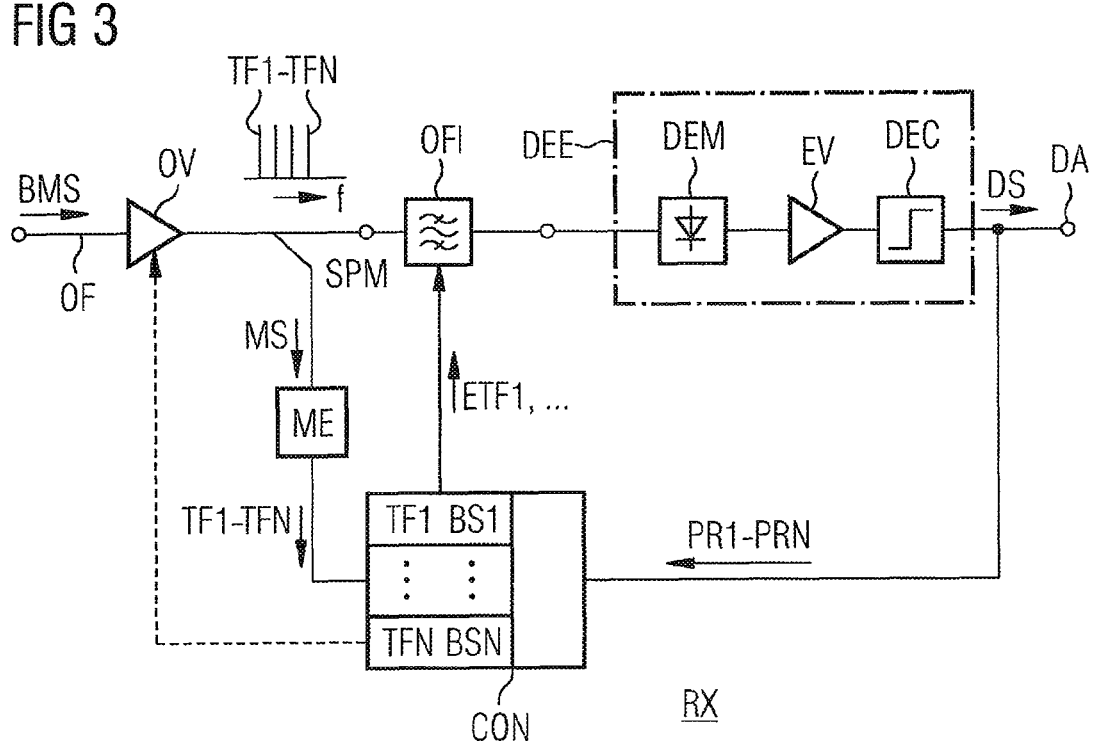
FIG. 3 shows a basic circuit diagram of an optical receiver.

FIG. 3 shows a basic circuit diagram of the receiving device RX. The burst time-division multiplex signal BMS received via the optical fiber OF is supplied to an optical amplifier OV which amplifies it and adds ASE. The amplified signal is then supplied via an adjustable optical bandpass filter OFI to a demodulation device DEE. This contains a demodulator DEM which can be implemented by a photodiode in the case of amplitude modulation. The demodulator is followed by the series circuit of an electrical amplifier EV and a decider stage DEC which converts the demodulated and amplified signal into a binary signal DS and delivers it at a data output DA.

Firstly, it is required to measure the carrier frequencies or to determine the filter adjustment values, respectively, for each burst signal. From the received burst time-division multiplex signal BMS, a measurement signal MS is branched off by a splitter SPM—here arranged following the optical amplifier OV—and supplied to a measuring device ME which measures the carrier frequencies TF1-TFN of the burst signals BS1-BSN and forwards the results to a controller CON (which can be part of an OLT system controller) which allocates, and stores, the measurement results to the burst signals directly or converted into filter adjustment values. The allocation to the burst signals can be made with the aid of the preambles PR1 to PRN of the burst signals. During the connection setup, called "ranging", since the central node knows in any case which ONT has been addressed by it, it can evaluate the preambles as control function. If the carrier frequencies are used as filter adjustment values, it must still be converted by means of stored tables or functions into (electrical) adjustment values which directly determine the filter characteristics. These electrical filter adjustment values can also be stored instead of the carrier frequencies and then used directly for presetting the bandpass filter. Measuring the carrier frequencies or determining the filter adjustment values is advantageously carried out during a turn-on phase (ranging) since there is adequate time available here for measurements. During the operation, measurements can then be made additionally, and, as a rule, slight corrections of the stored filter adjustment values or carrier frequencies.

Instead of using frequency measurement, the filter adjustment values can be determined directly by tuning the bandpass filter to optimum signal quality—to the highest receive level in the simplest case. This can be done, for example, by using the look-in principle.

During the operation, the controller CON of the central node OLT receives from the output of the decider stage DEC the preamble PR1-PRN, preceding each burst signal BS1-BSN (or the receive timeslot allocated to each received burst signal is known to the system controller of the central node in any case), and, after the end of a burst, sets the center frequency of the optical bandpass filter OFI in accordance with the expected carrier frequency for the following burst signal as early as possible. This can be done as early as at the end of the preceding burst signal. The ASE is reduced by a maximum by the optimally adapted bandwidth and the precisely set center frequency provides for optimum demodulation.

If signals having different bandwidths are sent, the bandwidth of the bandpass filter can also be adapted by presetting.

In order to achieve optimum sampling of the demodulated electrical burst signals by the decider stage DEC in the case of amplitude modulation (on/off), either its input level can be kept constant or its threshold can be controlled. The amplitude can be controlled by either controlling the levels of the optical burst signals or the levels of the electrical signals supplied to the decider stage. A fast level control of the received optical signal can be carried out by a Raman or semiconductor amplifier. The measured level values or corresponding level adjustment values for the amplification are also stored in the controller CON and the optical amplifier is correspondingly preset. The electrical amplifier EV can be preset in the same manner so that the amplitude values of the input signal of the decider stage DEC remain constant. As an alternative, the threshold of the decider stage can be preset differently from burst signal to burst signal in order to always optimally sample the input signal.

Figure 4:
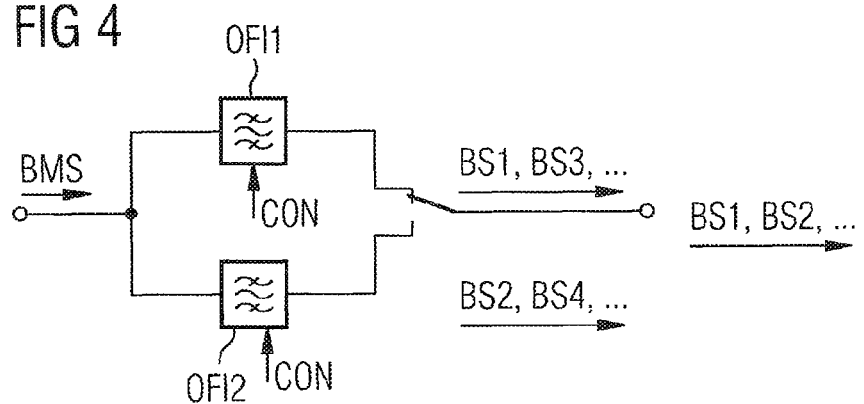
FIG. 4 shows a variant of the filter arrangement.

Since it is not yet possible at present to reset optical filters in the required very short time in the case of high PON data rates, the time problem can be solved by replacing the optical bandpass filter with two bandpass filters OFI1 and OFI2, connected in parallel at the input end, as shown in FIG. 4. Whilst the burst signal BS1 is output by the first optical bandpass filter OFI1, the second bandpass filter OFI2 is already tuned etc. to the carrier frequency TS2 of the second burst signal BS2 so that more than the entire period of the burst signal BS1 is available for the tuning. Naturally, this method can be expanded to more than two bandpass filters.

Figure 5:
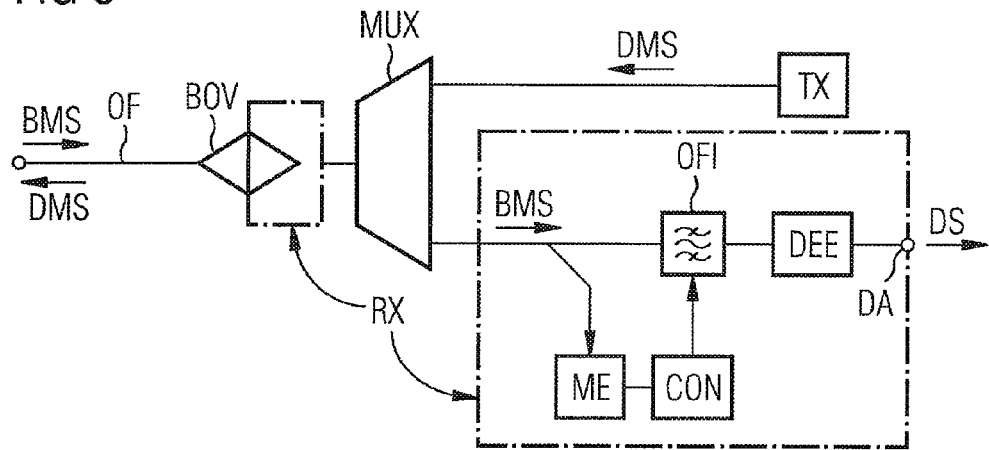
FIG. 5 shows a central node (OLT).

FIG. 5 shows the basic configuration of a central node OLT with the receiving device RX according to the invention. In the downstream direction, a downstream time-division multiplex signal DMS is transmitted by the transmitting device TX by a multiplexer MUX and a bidirectional optical amplifier BOV via the optical fiber OF to the user devices ONT1-ONTN. In the opposite direction, the burst time-division multiplex signal BMS is received and supplied via the multiplexer MUX to the receiving device RX known from FIG. 3. The optical receiving amplifier thereof is now part of the bidirectional optical amplifier BOV.

Figure 6:
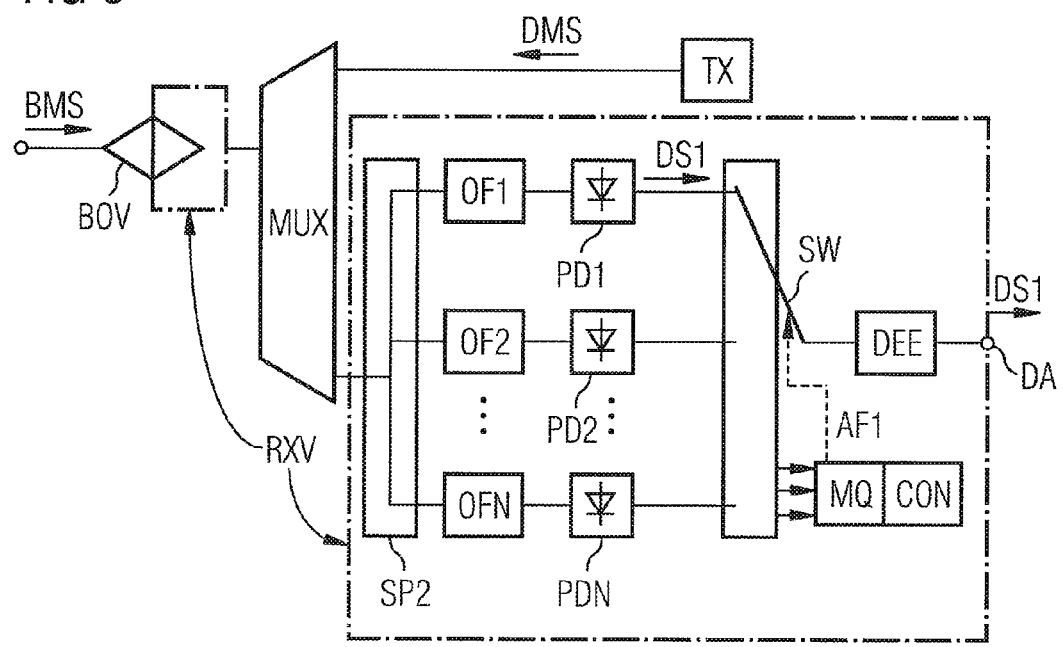
FIG. 6 shows a variant of the central node with filter banks.

FIG. 6 shows a further central node OLT2 with a variant of the receiving device RXV. The received burst time-division multiplex signal BMS is divided by a splitter SP2 to different signal branches into which optical filters OF1 to OFN are inserted with mutually differing center frequencies and overlapping passbands. Equivalent thereto is a wavelength-division demultiplexer in which the passbands of the channels also overlap. The outputs of all optical bandpass filters are in each case connected to a demodulation device, in this case photodiodes PD1 to PDN, which deliver binary electrical signals of different quality in dependence on the correspondence of passband and carrier frequency. The quality ((pseudo) error rate, OSNR, eye opening) of the binary signals is measured in the measuring device MQ, the measurement of the level is adequate, as a rule, and is evaluated by the controller CON. The optimum binary signals are in each case stored, allocated to a burst signal, as filter selection values AF1, . . . , AFN. In the operating case, the qualitatively best binary signal is preselected for each burst signal and switched through via a switch SW (multiplexer) for further processing to a demodulation device DEE which delivers the optimum binary signal at the data output DA.

LIST OF REFERENCE DESIGNATIONS

OLT Central node (Optical Line Terminal)
OF Optical fiber
OV Optical amplifier
SP Splitter
ONT1, User device (Optical Network Terminal)
SP1 Splitter
OFI Adjustable optical filter
OFI1, OFI2 Adjustable first/second optical filter
DEM Demodulator/optoelectrical transducer
EV Electrical amplifier
DEC Decider stage
CON Controller
ME Measuring device
DMS Downstream time-division multiplex signal
BMS (Upstream) burst time-division multiplex signal
TF1 Carrier frequency
DEE Demodulation unit
FRU Upstream pulse frame
FRA Frame start
PR1, PR2 Preamble
RX Receiving device
RA Frame start identifier
ME Measuring device MS Measurement signal
DS Binary signal
DA Data output
BS Burst signal
TX Transmitting device
BOV Bidirectional optical amplifier

The invention claimed is:

1. A method for improving signal quality of received optical burst signals, which are transmitted by several user devices in time-division multiplex mode to a receiving device with an optical amplifier and an optical bandpass filter connected downstream of the optical amplifier, the method comprising the steps of:
   determining filter adjustment values for each of the burst signals; and
   storing at the receiving device, for each burst signal, an allocated filter adjustment value; and
   presetting a center frequency of the optical bandpass filter for each received subsequent burst signal transmitted by one of the user devices according to a stored filter adjustment value allocated to said subsequent burst signal.

2. The method as claimed in claim 1, wherein, when burst signals with different bandwidths are transmitted, the bandwidth of the bandpass filter is preset to an optimally adapted bandwidth in accordance with the data rate of each burst signal.

3. The method as claimed in claim 2, wherein the filter adjustment values are determined by tuning the optical bandpass filter.

4. The method as claimed in claim 3, wherein, during a turn-on phase, the bandpass filter is optimally tuned for each burst signal transmitted by the user devices and the filter adjustment value is determined and stored, allocated to the burst signal or to a respective user device.

5. The method as clamed in claim 2, wherein
   carrier frequencies of the burst signals transmitted by the user devices are measured; and
   carrier frequencies or adjustment values derived from said carrier frequencies are stored as filter adjustment values.

6. The method as claimed in claim 5, wherein, during a turn-on phase, the carrier frequencies of the burst signals are measured; and
   the carrier frequencies or the derived adjustment values are stored as filter adjustment values, allocated to the burst signals or the respective user devices.

7. The method as claimed in claim 5, wherein, during an operation phase, the carrier frequencies of the burst signals are measured and previously stored filter adjustment values are corrected according to the carrier frequency measurements.

8. The method as claimed in claim 2, wherein amplification of an optical amplifier receiving the optical burst signals is preset in dependence on the burst signals such that the levels of the amplified burst signals have a constant amplitude.

9. The method as claimed in claim 2, wherein amplification of an electrical amplifier, which is connected downstream of an optoelectrical transducer connected downstream of the optical amplifier, is preset such that the input levels of a decider stage connected downstream of the optoelectrical transducer are constant or that the threshold of a decider stage, receiving an electrical binary signal from the optoelectrical transducer, is adjusted in dependence on the burst signals so that optimum sampling occurs with all burst signals.

10. The method as claimed in claim 1, wherein the filter adjustment values are determined by tuning the optical bandpass filter.

11. The method as claimed in claim 10, wherein, during a turn-on phase, the bandpass filter is optimally tuned for each burst signal transmitted by the user devices and the filter adjustment value is determined and stored, allocated to the burst signal or to a respective user device.

12. The method as clamed in claim 1, wherein
   carrier frequencies of the burst signals transmitted by the user devices are measured; and
   carrier frequencies or adjustment values derived from said carrier frequencies are stored as filter adjustment values.

13. The method as claimed in claim 12, wherein, during a turn-on phase, the carrier frequencies of the burst signals are measured; and
   the carrier frequencies or the derived adjustment values are stored as filter adjustment values, allocated to the burst signals or the respective user devices.

14. The method as claimed in claim 10, wherein, during an operation phase, the carrier frequencies of the burst signals are measured and previously stored filter adjustment values are corrected according to the carrier frequency measurements.

15. The method as claimed in claim 1, wherein amplification of an optical amplifier receiving the optical burst signals is preset in dependence on the burst signals such that the levels of the amplified burst signals have a constant amplitude.

16. The method as claimed in claim 1, wherein amplification of an electrical amplifier, which is connected downstream of an optoelectrical transducer connected downstream of the optical amplifier, is preset such that the input levels of a decider stage connected downstream of the optoelectrical transducer are constant or that the threshold of a decider stage, receiving an electrical binary signal from the optoelectrical transducer, is adjusted in dependence on the burst signals so that optimum sampling occurs with all burst signals.

17. An arrangement for improving signal quality of received optical burst signals which are transmitted by several user devices in time-division multiplex mode to a receiving device, comprising:
   an optical amplifier, downstream of which an adjustable optical bandpass filter is connected, and including a measuring device and a controller for optimally adjusting the bandpass filter;
   the controller constructed:
   for determining, for each burst signal or respective user device, an allocated filter adjustment value and storing it, allocated to the respective burst signal or to the respective user device; and
   in an operating phase, for presetting the center frequency of the bandpass filter for each received subsequent burst signal in accordance with a stored filter adjustment values allocated to said subsequent burst signal.

18. The arrangement as claimed in claim 17, wherein center frequency and bandwidth of the bandpass filter are adjustable.

19. The arrangement as claimed in claim 18, wherein the controller is constructed:
   for determining, during a turn-on phase, the carrier frequencies of the burst signals; and
   for storing the determined values as filter adjustment values, allocated to the burst signals or the user devices.

20. The arrangement as claimed in claim 19, wherein the controller is constructed to determine, during the operation phase, the filter adjustment values or to measure the carrier frequencies of the burst signals to be used as filter adjustment values, and to correct previously stored filter adjustment values.

21. The arrangement as claimed in claim 18, wherein a second bandpass filter is connected functionally in parallel with said bandpass filter, and wherein, said bandpass filters alternately output a burst signal, which is fed to an optoelectrical transducer, while the other bandpass filter is adjusted to the carrier frequency of the subsequent burst signal.

22. The arrangement as claimed in claim 21, wherein the controller is constructed to determine, during the operation phase, the filter adjustment values or to measure the carrier frequencies of the burst signals to be used as filter adjustment values, and to correct previously stored filter adjustment values.

23. The arrangement as claimed in claim 21, wherein the controller is constructed:
for presetting amplification of an electrical amplifier connected downstream of the optoelectrical transducer, which is connected downstream of the optical filter, in such a manner that a binary signal, derived from a corresponding optical burst signal with a constant amplitude is obtained, or
for presetting a threshold of a decider stage for said binary signal in such a manner that the decider stage samples its input binary signal optimally.

24. The arrangement as claimed in claim 18, wherein the controller is constructed to determine, during the operation phase, the filter adjustment values or to measure the carrier frequencies of the burst signals to be used as filter adjustment values, and to correct previously stored filter adjustment values.

25. The arrangement as claimed in claim 17, wherein the controller is constructed:
for determining, during a turn-on phase, the carrier frequencies of the burst signals; and
for storing the determined values as filter adjustment values, allocated to the burst signals or the user devices.

26. The arrangement as claimed in claim 17, wherein a second bandpass filter is connected functionally in parallel with said bandpass filter, and wherein, said bandpass filters alternately output a burst signal, which is fed to an optoelectrical transducer, while the other bandpass filter is adjusted to the carrier frequency of the subsequent burst signal.

27. The arrangement as claimed in claim 26, wherein the controller is constructed:
for presetting amplification of an electrical amplifier connected downstream of the optoelectrical transducer, which is connected downstream of the optical filter, in such a manner that a binary signal, derived from a corresponding optical burst signal with a constant amplitude is obtained, or
for presetting a threshold of a decider stage for said binary signal in such a manner that the decider stage samples its input binary signal optimally.

28. The arrangement as claimed in claim 17, wherein the controller is constructed to determine, during the operation phase, the filter adjustment values or to measure the carrier frequencies of the burst signals to be used as filter adjustment values, and to correct previously stored filter adjustment values.

29. The arrangement as claimed in claim 17, wherein the controller is constructed for presetting the amplification of the optical amplifier such that the amplified burst signals have a constant amplitude.

30. The arrangement as claimed in claim 17, wherein the controller is constructed:
for presetting amplification of an electrical amplifier connected downstream of the optoelectrical transducer, which is connected downstream of the optical filter, in such a manner that a binary signal, derived from a corresponding optical burst signal with a constant amplitude is obtained, or
for presetting a threshold of a decider stage for said binary signal in such a manner that the decider stage samples its input binary signal optimally.

31. An arrangement for improving signal quality of received optical burst signals, which are transmitted by several user devices in time-division multiplex mode to a receiving device, comprising:
an optical amplifier;
several bandpass filters, connected functionally in parallel downstream of the optical amplifier, having different center frequencies and overlapping passbands, and in each case, an optoelectrical transducer, which delivers an electrical binary signal, connected downstream of each bandpass filter; and
a controller constructed to select in accordance with stored filter selection values via a selector, after an end of a burst signal, one of said optical bandpass filters having the optimum center frequency for the subsequent burst signal.

32. The arrangement as claimed in claim 31, further comprising a measuring device constructed for measuring signal qualities of electrical binary signals received from optoelectrical transducers, and the controller is constructed for selecting, on a basis of a measured signal quality, for each burst signal, an optimum binary signal and, therefore, one of the optical bandpass filters, and for storing a filter selection value, allocated to the corresponding burst signal.

33. The arrangement as claimed in claim 31, wherein the controller is constructed for measuring the carrier frequencies of the burst signals during an operation phase and changing previously stored filter selection values.

34. The arrangement as claimed in claim 32, wherein the controller is constructed for measuring the carrier frequencies of the burst signals during an operation phase and changing previously stored filter selection values.

35. The arrangement as claimed in claim 31, wherein the controller is constructed for presetting the amplification of the optical amplifier such that the amplified burst signals have a constant amplitude.

36. The arrangement as claimed in claim 31, wherein the controller is constructed:
for presetting amplification of an electrical amplifier connected downstream of the optoelectrical transducers, which are connected downstream of the optical filters, in such a manner that a binary signal, derived from a corresponding optical burst signal with a constant amplitude is obtained, or
for presetting a threshold of a decider stage for said binary signal in such a manner that the decider stage samples its input binary signal optimally.

* * * * *